US006894882B2

(12) United States Patent
Maru et al.

(10) Patent No.: US 6,894,882 B2
(45) Date of Patent: May 17, 2005

(54) D.C. POWER SUPPLY CIRCUIT AND ELECTRONIC APPARATUS USING SUCH CIRCUITS

(75) Inventors: Naoki Maru, Hadano (JP); Akihiro Sakurai, Hadano (JP); Hiroshi Kamee, Hadano (JP)

(73) Assignees: Hitachi, Ltd., Tokyo (JP); Hitachi Information Technology Co., Ltd., Kanagawa (JP)

( * ) Notice: Subject to any disclaimer, the term of this patent is extended or adjusted under 35 U.S.C. 154(b) by 462 days.

(21) Appl. No.: 09/800,760

(22) Filed: Mar. 6, 2001

(65) Prior Publication Data

US 2001/0020803 A1 Sep. 13, 2001

(30) Foreign Application Priority Data

Mar. 9, 2000 (JP) ........................................ 2000-065446

(51) Int. Cl.[7] ................................................ H02H 9/00
(52) U.S. Cl. ...................... 361/91.1; 361/90; 361/100
(58) Field of Search .......................... 361/18, 100, 62, 361/64, 66, 58, 90, 91.1

(56) References Cited

U.S. PATENT DOCUMENTS 4,309,748 A * 1/1982 Forro et al. .................... 363/65
5,659,208 A * 8/1997 Kimble et al. ................ 307/82
6,301,133 B1 * 10/2001 Cuadra et al. ................ 363/65

OTHER PUBLICATIONS

Toshio, S., et al. "Synchronous Rectification System Non–Insulating Type DC/DC Converter," Japanese patent abstract 11–187651; Jul. 9, 1999, pp. 5.

Yuichi, Y., et al. "Detection System for Overvoltage in Parallel Operation," Japanese patent abstract 05–189065; Jul 30, 1993; pp. 10.

* cited by examiner

Primary Examiner—Stephen W. Jackson
(74) Attorney, Agent, or Firm—Townsend and Townsend and Crew LLP

(57) ABSTRACT

The present invention relates generally to D.C. power supplies and more particularly to overvoltage protection in one or more D.C. power supply circuits, where a plurality of D.C. power supplies may be connected together to supply power to an electronic system. In one embodiment a D.C. power supply circuit is provided which, when used with the plurality of D.C. power supply circuits connected in parallel, is capable of stopping only the power supply circuit having run into an overvoltage state with minimal effect on the other D.C. power supply circuits. Thus power to the load is continued.

28 Claims, 4 Drawing Sheets

D.C. POWER SUPPLY CIRCUIT AND ELECTRONIC APPARATUS USING SUCH CIRCUITS

CROSS-REFERENCES TO RELATED APPLICATIONS

This application is related to and claims priority from Japanese Patent Application No. 2000-065446, filed on Mar. 9, 2000.

BACKGROUND OF THE INVENTION

The present invention relates generally to D.C. power supplies and more particularly to overvoltage protection in one or more D.C. power supply circuits, where a plurality of D.C. power supplies may be connected together to supply power to an electronic system.

Typically, in an electronic apparatus such as a large computer for instance, in order to prevent any trouble with a power supply circuit from stopping the electronic apparatus, a plurality of D.C. power supply circuits are connected in parallel for redundant operation. Thus if one D.C. power supply fails, the other D.C. power supplies continue to supply the necessary power needed by the load.

In a conventional D.C. power supply, overvoltage protection is also provided. The D.C. power supply contains an overvoltage circuit which detects if the D.C. output voltage surpasses a prescribed voltage and if so, turns off the D.C. power supply. Where a plurality of D.C. power supply circuits are used in parallel connection, in conventional D.C. power supply circuits, if for example the D.C. output of one of the power supply circuits becomes an overvoltage and an overvoltage detecting circuit is actuated. In addition, the overvoltage of this D.C. power supply circuit also actuates the overvoltage detecting circuits of the other D.C. power supply circuits, resulting in a problem that the other D.C. power supply circuits which are not in an overvoltage state are also stopped.

Thus there is a need for a D.C. power supply with overvoltage protection, that can be used as a standalone or in combination with other D.C. power supplies. And when the D.C. power supply is used together with other power supplies, the D.C. power supply circuit having run into an overvoltage state only stops itself, and does not stop the other D.C. power supply circuits.

SUMMARY OF THE INVENTION

The present invention provides techniques for detecting and responding to an overvoltage in a D.C. power supply and/or continuously supplying power to a load when the overvoltage causes shutdown of one D.C. power supply of a plurality of D.C. power supplies supplying power to the load. An example is N+1, i.e., redundant by one, power supplies providing D.C. power to a load, for example, a computer. When one power supply of the N+1 power supplies shuts down due to an overvoltage in the one power supply, the other operational power supplies continue to provide the necessary power to the computer.

An embodiment of the present invention provides a D.C. power supply circuit for obtaining a D.C. output by low pass filtering signals that have been pulse width-modulated and rectified filtering. The D.C. power circuit includes a first overvoltage detecting circuit which detects any surpassing of a first reference voltage by an input voltage of a filtering low pass filtering circuit; a second overvoltage detecting circuit for detecting any surpassing of a second reference voltage by an output of the filtering circuit; and a logic circuit for detecting an overvoltage state when the first overvoltage detecting circuit and second overvoltage detecting circuit have surpassed their respective reference voltages, wherein the D.C. output is stopped by the output of this logic circuit.

Another embodiment provides a D.C. power supply circuit for obtaining a D.C. output by filtering signals, using a filter, that are pulse width-modulated and rectified. The D.C. power supply includes a diode of which either the anode side or the cathode side is connected to the filter and either the cathode side or the anode side is connected to a load; a first overvoltage detecting circuit for detecting any surpassing of a first reference voltage by the anode side voltage of the diode; a second overvoltage detecting circuit for detecting any surpassing of a second reference voltage by the cathode side voltage of the diode; and a logic circuit for detecting an overvoltage state when the first overvoltage detecting circuit and second overvoltage detecting circuit have surpassed the respective reference voltages, wherein the D.C. output is stopped by the output of this logic circuit.

Yet another embodiment provides a D.C. power supply circuit for obtaining a D.C. output by filtering signals, using a filter, that are pulse width-modulated and rectified. The D.C. power supply includes a diode of which either the anode side or the cathode side is connected to the filter and either the cathode side or the anode side is connected to a load; a first overvoltage detecting circuit for detecting any surpassing of either the cathode side or anode side voltage by a voltage resulting from voltage division of either the anode side or cathode side voltage of the diode; a second overvoltage detecting circuit for detecting any surpassing of a second reference voltage by either the cathode side or anode side voltage of the diode; and a logic circuit for detecting an overvoltage state when the first overvoltage detecting circuit and second overvoltage detecting circuit have surpassed the respective reference voltages, wherein the D.C. output is stopped by the output of this logic circuit.

An embodiment of the present invention provides a method for supplying a load voltage to a load, for example a computer system. The load voltage is supplied from a D.C. power supply coupled to the load where the D.C. power supply asserts a first value when an internal voltage is above a predetermined voltage; asserts a second value when the load voltage is above a reference voltage; and stops output of the load voltage, when the first value and second value are asserted; In addition the load voltage is supplied from a redundant D.C. power supply coupled to the load, so that the load voltage continues to be supplied even if the first D.C. power supply stops its output of the load voltage.

Another embodiment of the present invention provides a D.C. power supply system with overvoltage protection for supplying power to a load, the system includes a plurality of D.C. power supply circuits connected in parallel. The plurality of D.C. power supply circuits include: a first D.C. power supply circuit having: first overvoltage detection circuit for detecting if a voltage internal to the first D.C. power supply circuit exceeds a first predetermined voltage; a second overvoltage detection circuit for detecting if a first output of the first D.C. power supply circuit exceeds a first reference voltage, where the first output is connected to the load; and a first control circuit for shutting off the first D.C. power supply circuit, when the first overvoltage detecting circuit detects exceeding of the predetermined voltage and the second overvoltage detecting circuit detects exceeding of the reference voltage; and a second D.C. power supply circuit including the same or similar circuits as the first D.C. power supply.

In an alternative embodiment of the present invention an overvoltage system for N+1 D.C. power supplies supplying a load voltage to a load is provided. The N+1 D.C. power supplies are coupled together in parallel, where N is an integer (for example N=1 and N+1=2). The overvoltage system includes: a first power supply of the N+1 D.C. power supplies, having a plurality of overvoltage detecting circuits, where one overvoltage detecting circuit compares the load voltage with a reference voltage; and a logic gate receiving outputs of the plurality of overvoltage detecting circuits for turning off the first power supply when an overvoltage occurs in the first power supply; and N other power supplies of said N+1 D.C. power supplies, where when the first power supply is turned off, the N other power supplies continue to supply power to the load to maintain the load voltage.

These and other embodiments of the present invention are described in more detail in conjunction with the text below and attached figures.

DESCRIPTION OF THE SPECIFIC EMBODIMENTS

The configuration and operation of a D.C. power supply circuit in a first embodiment of the invention will be described below with reference to FIG. 1 and FIG. 2.

Figure 1:
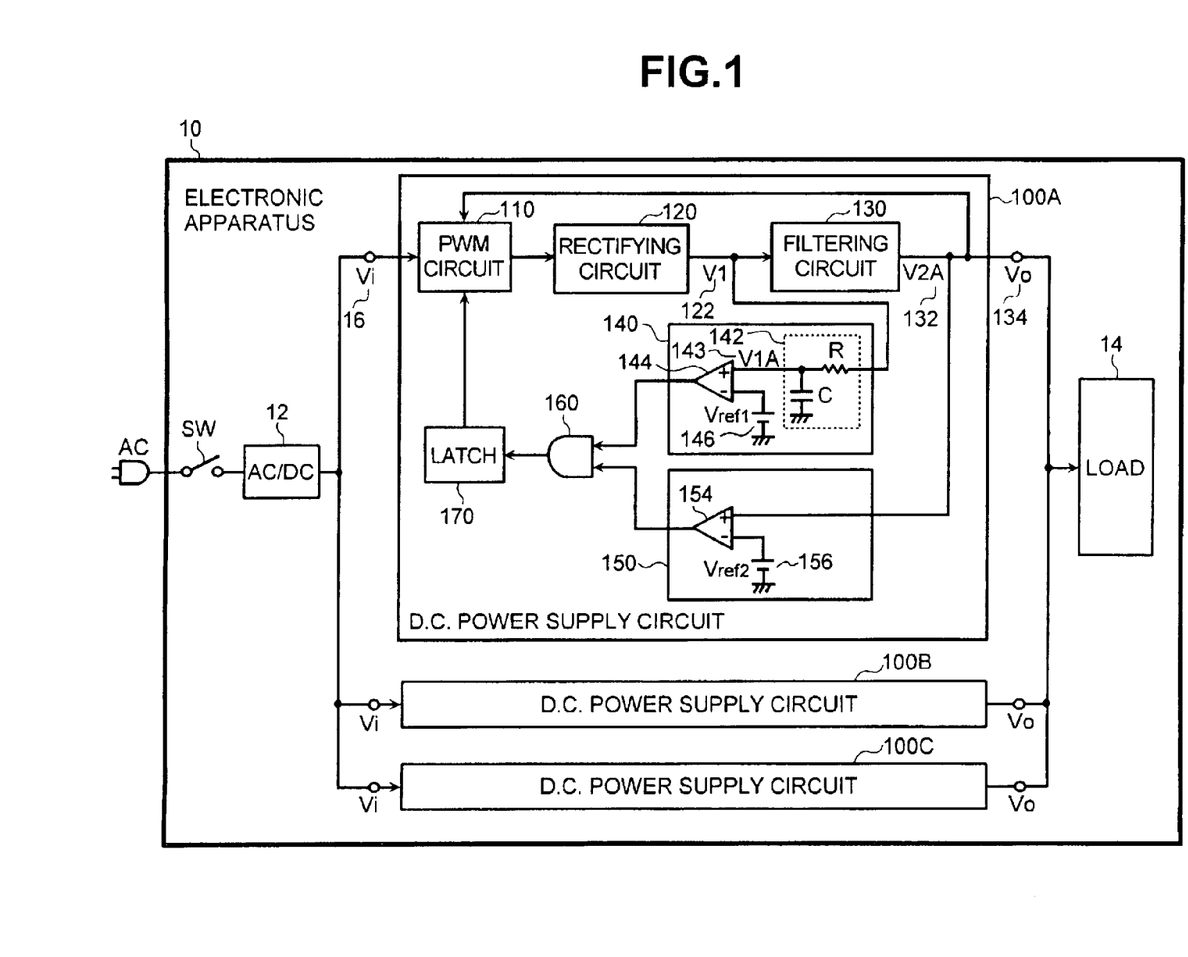
FIG. 1 shows a block diagram of an electronic apparatus using D.C. power supply circuits in a first embodiment of the present invention.
Figure 2:
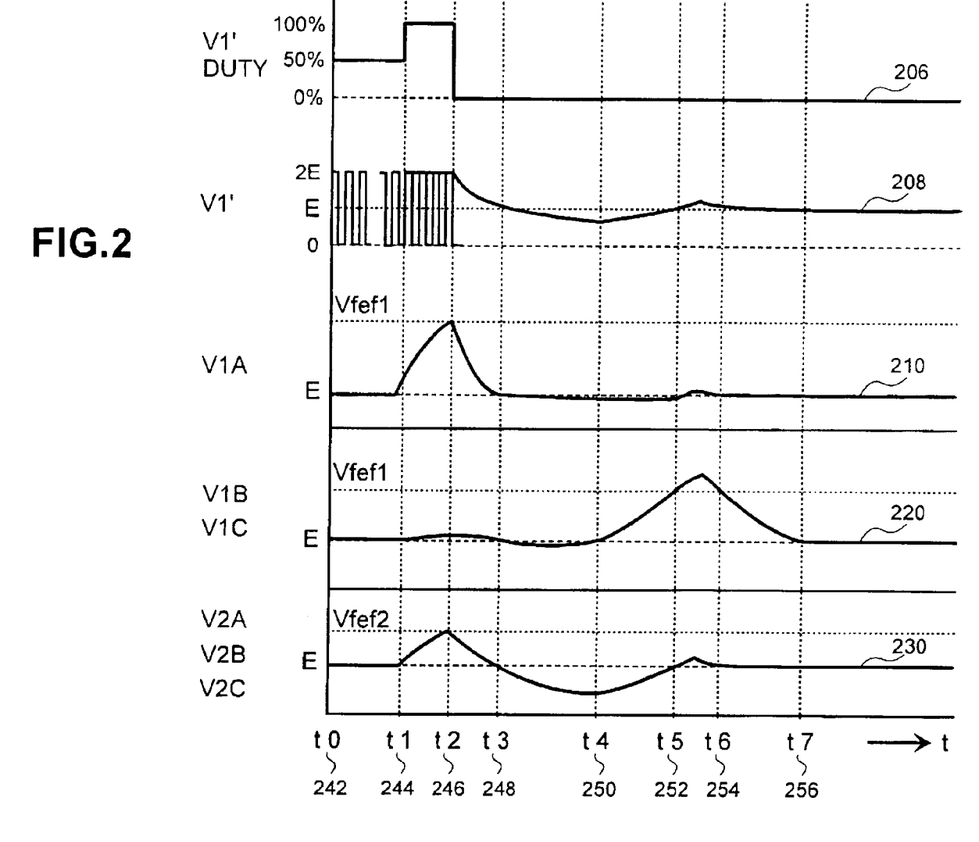
FIG. 2 shows a waveform diagram illustrating the operation of D.C. power supply circuits connected in parallel in the first embodiment of the present invention.

FIG. 1 is a block diagram of an electronic apparatus using D.C. power supply circuits in the first embodiment of the present invention, and FIG. 2, a waveform diagram illustrating the operation of D.C. power supply circuits connected in parallel in the first embodiment of the invention.

An electronic apparatus 10 in this embodiment is provided with an A.C./D.C. converter 12, a load 14 and a plurality of D.C. power supply circuits 100A, 100B and 100C connected together in parallel. The A.C./D.C. converter 12 converts an A.C. input entered via a switch SW into a D.C. output. The load 14 is an electronic load, for example, an LSI circuit or an IC circuit, corresponding to, for instance, a high density module in a large computer. The load 14 is supplied with a prescribed constant voltage Vo from the D.C. power supply circuits 100A, 100B and 100C and operates thereon. The D.C. power supply circuits 100A, 100B and 100C have the same or similar circuit configuration. In one embodiment, the configuration is redundant by one circuit (i.e., a N+1 power supply configuration, where here N=2 and there is one redundant power supply) relative to the current capacity for supply to the load 14. Therefore if, for instance, the operation of the power supply circuit 100C stops, the voltage (and current) supplied from the power supply circuits 100A and 100B enables the load 14 to continue normal operation.

The configuration of the D.C. power supply circuits 100A, 100B and 100C will be described here, with the D.C. power supply circuit 100A used as the example circuit for the three power supplies.

One embodiment of the D.C. power supply circuit 100A includes a PWM (pulse width-modulating) circuit 110, a rectifying circuit 120, a filtering circuit 130, overvoltage detecting circuits 140 and 150, a logic circuit 160, and a latching circuit 170.

The PWM circuit 110, to which an output voltage V2A 132 of the filtering circuit 130 is fed back, subjects a D.C. input voltage Vi 16 to PWM (pulse width modulation) to convert it into an A.C. voltage, so that the output voltage V2A 132 of the filtering circuit 130 (for example, a low pass filter) is a constant voltage, The rectifying circuit 120 rectifies the A.C. output of the PWM circuit 110, and outputs the rectified voltage V1 122 to the filtering circuit 130. The filtering circuit 130 low pass filters the output V1 120 of the rectifying circuit 120, and outputs it as the D.C. voltage V2A 132. The output V2A of filtering circuit 130 is equal to the output Vo 134 of the output D.C. power supply circuit 100A.

The output voltage of the Rectifying circuit 120, V1 122 is inputted to a first overvoltage detecting circuit 140, The output voltage V2A 132 of the filtering circuit 130, is inputted to a second overvoltage detecting circuit 150.

The first overvoltage detecting circuit 140 includes a simplified filtering circuit 142, a comparator 144 and a reference voltage 146. The simplified filtering circuit 142, includes a resistor R and a capacitor C. The filtering circuit 142 has RC time constant that is about equal to or less than the filtering circuit 130. Therefore, the RC circuit 142, though it does smooth the output voltage V1 122 of the rectifying circuit 120, may have a small ripple content in its output voltage VIA 143. The output of the filtering circuit 142, i.e., V1A 143, is inputted to the positive input terminal of the comparator 144, and a first reference voltage Vref1 146 from a reference voltage source is inputted to the negative input terminal of the comparator 144. The comparator 144 compares the output voltage of the filtering circuit 142, V1A 143 and the reference voltage Vref1 146 and, if the voltage V1A 143 is higher than the reference voltage Vref1 146, outputs a H (high) voltage level or, if it is lower, outputs an L (low) voltage level. Here, the first reference voltage Vref1 146 is set to a voltage higher by, for example, 20% than a rated voltage E. If the rated voltage E is 3.3 V, for example, the first reference voltage Vref1 146 is set to 4.0 V.

The second overvoltage detecting circuit 150 includes a comparator 154 and a reference voltage Vref2 156. The output voltage V2A 132 of the filtering circuit 130 is inputted to the positive input terminal of the comparator 154, and to the negative input terminal of the comparator 154 is inputted a second reference voltage Vref2 156 from another reference voltage source. The comparator 154 compares the output voltage V2A 132 of the filtering circuit 130 with the reference voltage VrefV2 156 and, if the voltage V2A is higher than the reference voltage VrefV2, outputs an H level or, if it is lower, outputs an L level. Here the second reference voltage VrefV2 is set to a voltage higher by, for example, 10% than the rated voltage E. If the rated voltage E is V2 3.3 V, for example, the second reference voltage VrefV1 is set to 3.6 V.

The logic circuit 160 outputs the logical product of the output of the first overvoltage circuit 140 and the output of the second overvoltage detecting circuit 150. The logic circuit 160, for example, an AND gate, outputs an H level when the outputs of both the first overvoltage detecting circuit 140 and the second overvoltage detecting circuit 150 have taken on an H level. Thus the logic circuit 160, when both the first overvoltage detecting circuit 140 and the second overvoltage detecting circuit 150 have detected an overvoltage, outputs a signal indicating the detection of an H level output, namely an overvoltage.

The output of the logic circuit 160, after being held by the latching circuit 170, is inputted to the PWM circuit 110. When the output of the latching circuit 170 is at an H level, the PWM circuit 110 stops its PWM operation to halt the operation of the D.C. power supply circuit 100A. An IC circuit constituting the PWM circuit 110 is provided with an enable terminal and, by inputting, for instance, the output of the latching circuit 170 to this enable terminal, the operation of the PWM circuit 110 can be either stopped or allowed to continue running.

Optionally, by supplying the output of the logic circuit 160 outside the D.C. power supply circuit 100A, the occurrence of an overvoltage in the D.C. power supply circuit 100A can be reported and noted to outside the D.C. power supply circuit 100A.

Next, with reference to FIG. 2, the operations of the D.C. power supply circuits 100A, 100B and 100C in this embodiment are described. FIG. 2 illustrates a case in which an overvoltage has occurred in the D.C. power supply circuit 100A as a consequence of trouble or the like.

FIG. 2 shows several voltage waveforms of D.C. Power Supply Circuits 100A, 100B, and 100C, when D.C. Power Supply Circuit 100A has an overvoltage. In FIG. 2, the horizontal axis represents the time t, and the vertical axis, the voltage. Graph 208 shows the output of the Rectifying Circuit 120, or V1 122. An example switching frequency of the rectified waveform between amplitude, for example, 0 and 2*E volts (where E=3.3 volts, for example) and time t0 242 and time t2 246 is 200 kHz. The duty cycle for V1 is shown by graph 206, i.e., V1 DUTY. Graph 210 shows voltage V1A 143 of the output of the RC circuit 142 of the D.C. power supply circuit 100A shown in FIG. 1. Graph 220 shows voltage V1B of the RC circuit 142 within the D.C. power supply circuit 100B shown in FIG. 1 and voltage V1C of the RC circuit 142 within the D.C. power supply circuit 100C shown in FIG. 1. The voltages V1B and V1C here are both from trouble-free power sources of the D.C. power supply circuits 100B and 100C and, as the same operation is involved, they have the same or similar waveforms. A small ripple content (not shown) may be superposed over the output of the RC circuit (graphs 210 and 220) and may be, for example, about 50 mv. FIG. 2 further illustrates in graph 230 a voltage V2A 132 of the output of the filtering circuit 130 of the D.C. power supply circuit 100A shown in FIG. 1, a voltage V2B of the output of the filtering circuit 130 of the D.C. power supply circuit 100B shown in FIG. 1, and a voltage V2C of the output of the filtering circuit 130 of the D.C. power supply circuit 100C shown in FIG. 1. The voltages V2A, V2B and V2C take on the same waveform as the D.C. outputs of the D.C. power supply circuits 100A, 100B and 100C are connected together in parallel.

As illustrated in FIG. 2 graphs 210, 220, and 230, the voltages V1A, V1B, V1C, V2A, V2B, and V2C are controlled to the rated voltage E of the D.C. power supply circuits by the internal PWM circuit of the D.C. power supply circuits 100A, 100B and 100C between points of time t0 242 and t1 244. The rated voltage E is, for example, 3.3 V.

Here it is supposed, for illustration purposes, that trouble has occurred in the D.C. power supply circuit 100A at the point of time t1 244. As a result, the D.C. power supply circuit 100A runs into an overvoltage state and, as illustrated in FIG. 2 graph 210, the voltage V1A of the RC filtering circuit 142 of the D.C. power supply circuit 100A gradually rises above the rated voltage E from time t1 244 to t2 246.

In the D.C. power supply circuit 100A, as a result of its running into an overvoltage state, the voltage V2A of the filtering circuit 130 rises as shown in FIG. 2 graph 230, between t1 244 and t2 246. Here, the filtering circuit 130 is a low pass, which for illustration purposes, has a larger time constant than the RC filter 142. Thus, the amplitude of the voltage V2A is smaller than that of the voltage V1A. With the rise of the voltage V2A, the voltages V2B and V2C also rise (they are all Vo 134). Further in the D.C. power supply circuits 100B and 100C, since the variations of the voltages V2B and V2C are attenuated by the filtering circuits within them, the voltages V1B and V1C vary less, as shown in FIG. 2 graph 220.

In the D.C. power supply circuit 100A, when the voltage V1A rises above the first reference voltage VrefV2 146 at the point of time t2 246 as shown in FIG. 2 graph 210, the first overvoltage detecting circuit 140 is actuated, and the output of the first overvoltage detecting circuit 140 takes on a H level. Also, as the voltage V2A rises above the second reference voltage VrefV2 156 at about time t2 246, the second overvoltage detecting circuit 150 is actuated, and the output of the second overvoltage detecting circuit 150 takes on a H level. As a result, the output of the logic circuit 160 takes on an H level, an overvoltage state is detected, the latch 170 is set, and the operation of the PWM circuit 110 is stopped. As shown by graph 206 V1 DUTY goes to zero. Thus the power output of the D.C. power supply circuit 100A essentially goes to zero. Note, although the timing of the operation of the first overvoltage detecting circuit 140 and that of the operation of the second overvoltage detecting circuit 150 are not necessarily the same, the operation of the D.C. power supply circuit 100A is stopped by the actuation of both overvoltage detecting circuits 140 and 150.

Between points of time t2 246 and t3 248, after the stopping of the operation of the D.C. power supply circuit 100A, the voltages V2A, V2B and V2C fall to the rated voltage E as shown in graph 230. Then, since the D.C. power supply circuit 100A is not operating, the voltage V1A begins to fall from t2 246 to t5 252. Further, since the variations of the voltages V2B and V2C are attenuated by the filtering circuits, the voltages V1B and V1C in graph 220 vary a small amount.

Then, the period between time t3 248 and t4 250 is a delay time during which the PWM circuits within the D.C. power supply circuits 100B and 100C detect falls of the voltages V2B and V2C and start responding. During this period, the voltages V2A, V2B and V2C keep on falling.

Next, between points of time t4 250 and t5 252, the PWM circuits within the D.C. power supply circuits 100B and 100C respond to the falls of the voltages V2B and V2C due to the stopping of the D.C. power supply circuit 100A, and expand the output pulse width, causing the voltages V1B and V1C to rise in graph 220, starting at t4 250.

As the voltages V1B and V1C surpass the first reference voltage VrefV1 in the D.C. power supply circuits 100B and 100C at a point of time t5 252 as shown in FIG. 2 graph 220, the outputs of the first overvoltage detecting circuits take on an H level in the D.C. power supply circuits 100B and 100C; but since the voltages V2B and V2C do not surpass the second reference voltage Vref2 as shown in FIG. 2 graph 230 between tV5 252 and t6 254, the second overvoltage detecting circuits of the D.C. power supply circuits 100B and 100C still output L. Therefore, the outputs of the logic circuits of the D.C. power supply circuits 100B and 100C remain at an L level, so that the logic circuits of the D.C. power supply circuits 100B and 100C detect no overvoltage state, with the result that the power supply operations of the D.C. power supply circuits 100B and 100C do not stop, and the voltages V2B and V2C of the filtering circuits of the D.C. power supply circuits 100B and 100C recover to the rated voltage E (starting before t6 254 to t7 256).

As hitherto described, in this embodiment, it is possible to stop only the power supply circuit which has run into an overvoltage state out of the D.C. power supply circuits connected in parallel without shutting off any other D.C. power supply circuit. Therefore, during redundant operation, even if one of the three D.C. power supply circuits stops, the remaining two circuits can provide the necessary power to the load 14. Accordingly, the electronic apparatus 10 is prevented from stopping.

Optionally, it is possible to report and identify a D.C. power source in a troubled overvoltage state within the electronic apparatus by taking out a detection signal of overvoltage state out of the D.C. power source, enabling the type and the location of the troubled power source which requires repair to be identified and thereby the time required for the repair from the trouble occurrence till the completion of repair to be reduced.

Next will be described the configuration and operation of a D.C. power supply circuit in a second embodiment of the invention with reference to FIG. 3.

Figure 3:
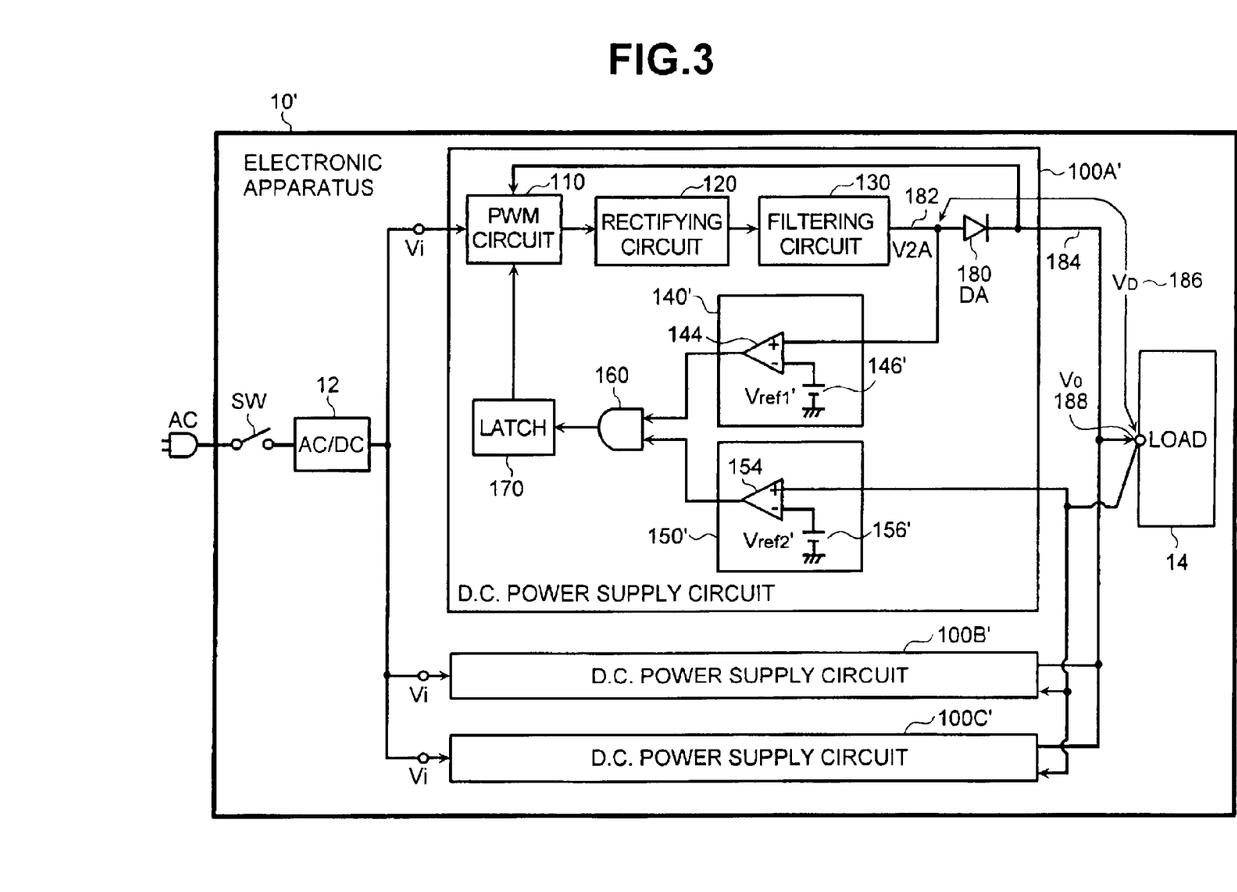
FIG. 3 shows a block diagram of an electronic apparatus using D.C. power supply circuits in a second embodiment of the present invention.

FIG. 3 is a block diagram of an electronic apparatus using a D.C. power supply circuit in the second embodiment of the invention. Incidentally, the same labels as in FIG. 1 denote respectively the same constituent elements.

An electronic apparatus 10' in this embodiment is provided with an A.C./D.C. converter 12, a load 14 and a plurality of D.C. power supply circuits 100A', 100B' and 100C' connected in parallel. The A.C./D.C. converter 12 and the load 14 are the same as the respectively corresponding ones shown in FIG. 1. The D.C. power supply circuits 100A', 100B' and 100C' have the same circuit configuration, the configuration being redundant by one circuit relative to the current capacity for supply to the load 14.

The configuration of the D.C. power supply circuits 100A', 100B' and 100C' will be described here, with the D.C. power supply circuit 100A' being taken up as an example.

The D.C. power supply circuit 100A' consists of a PWM (pulse width-modulating) circuit 110, a rectifying circuit 120, a filtering circuit 130, overvoltage detecting circuits 140' and 150', a logic circuit 160, a latching circuit 170 and a diode DA 180.

The configurations and operations of the PWM circuit 110, rectifying circuit 120 and filtering circuit 130 are the same as those of their respective counterparts shown in FIG. 1. To the output of the filtering circuit 130 is connected the diode DA 180. The anode side 182 of the diode DA is connected to the output end of the filtering circuit 130, while its cathode side 184 is connected to the load 14.

The anode side voltage V2A 182 of the diode DA 180 is inputted to the first overvoltage detecting circuit 140', while the input end voltage Vo 184 of the load 14 is inputted to the second overvoltage detecting circuit 150'.

The first overvoltage detecting circuit 140' consists of a comparator 144 and a reference voltage source 146'. A voltage V2A 182 is inputted to a positive input terminal of the comparator 144, while a first reference voltage Vref1' of the reference voltage 146' is inputted to a negative input terminal of the comparator 144. The comparator 144 compares the voltage V2A with the reference voltage Vref1 and, if the voltage V2A is higher than the reference voltage Vref1, outputs an H level or, if it is lower, outputs an L level.

The second overvoltage detecting circuit 150' consists of a comparator 154 and a reference voltage source 156'. The voltage Vo 188 is inputted to a positive input terminal of the comparator 154, while a second reference voltage Vref2' 156' of another reference voltage source is inputted to a negative input terminal of the comparator 154. The comparator 154 compares the voltage Vo with the reference voltage Vref2' and, if the voltage Vo is higher than the reference voltage Vref2", outputs an H level or, if it is lower, outputs an L level.

The logic circuit 160 outputs the logical product of the output of the first overvoltage detecting circuit 140' and the output of the second overvoltage detecting circuit 150'. The logic circuit 160 outputs an H level when the outputs of both the first overvoltage detecting circuit 140' and the second overvoltage detecting circuit 150' have taken on an H level. Thus the logic circuit 160, when both the first overvoltage detecting circuit 140' and the second overvoltage detecting circuit 150' have detected an overvoltage, outputs a signal indicating the detection of an H level output, namely an overvoltage.

The output of the logic circuit 160, after being held by the latching circuit 170, is inputted to the PWM circuit 110. When the output of the latching circuit 170 is at an H level, the PWM circuit 110 stops its PWM operation to halt the operation of the D.C. power supply circuit 100A'. An IC circuit constituting the PWM circuit 110 is provided with an enable terminal and, by inputting, for instance, the output of the latching circuit 170 to this enable terminal, the operation of the PWM circuit 110 can be either stopped or allowed to continue.

Optionally, by supplying the output of the logic circuit 160 outside the D.C. power supply circuit 100A', the occurrence of an overvoltage in the D.C. power supply circuit 100A can be reported and noted outside of the D.C. power supply circuit 100A.

The operation of the circuit in this embodiment will be described below.

The diode DA 180 is provided to prevent, if any one D.C. power supply circuit out of the D.C. power supply circuits connected to the load 14 in parallel is stopped by the detection of an overvoltage by the first overvoltage detecting circuit 140', that overvoltage from flowing into other normally operating D.C. power supply circuits and stopping those D.C. power supply circuits operating normally. Thus, in the configuration illustrated in FIG. 3, if for instance the D.C. power supply circuit 100C' runs into an overvoltage state, the input end voltage Vo to the load 14 will rise, but as this voltage rise is blocked by the diode DA in the D.C. power supply circuit 100A', the first overvoltage detecting circuit 140' is prevented from operating erroneously.

Further, the second overvoltage detecting circuit 150' is provided to prevent uneven voltage falls of the diode DA 180 and the like, when the diode DA has prevented any overvoltage from flowing into other power supply circuits, from causing the first overvoltage detecting circuit 140' to operate erroneously.

Here will be explained uneven voltage falls of the diode DA 180 and the like.

For instance, a fallen voltage of the diode DA 180 in the forward direction is denoted by VF. A voltage fall due to such factors as wiring between the cathode output of the diode DA 180 and the input of the load 14 is denoted by VC. Thus, a fallen voltage VD 186 between the anode side of the diode DA and the input end of the load 14 will be (VF+VC). As both the fallen voltages VF and VC are varied by a current flowing through the diode and the wiring, the fallen voltage VF, for instance, varies between 0 V and 0.7 V, and the fallen voltage VC varies between 0 V and 0.1 V. Thus the fallen voltage VD 186 varies between 0 V and 0.8 V. If, for instance, the rated voltage E of the input voltage Vo to the load 14 is 3.3 V, the fallen voltage VD 186 may be, for example, between 0 V and 0.8 V, and accordingly the anode side voltage 182 of the diode DA 184 is between 3.3 V and 4.1 V. If, in order to detect the input voltage Vo to the load 14 having surpassed the rated voltage E by 10% or more as an overvoltage, the first reference voltage Vref1' is set, for instance, 10% higher than the rated voltage of 3.3 V (3.6 V), a fallen voltage VD 186 of 0.8V, even though it is normal, will be detected as an overvoltage. On the other hand, if the first reference voltage Vref1 ' is set to be 10% higher than the rated voltage (3.3 V) plus 0.8 V, i.e. 4.5 V, when a fallen voltage VD 186 is close to 0 V, no overvoltage can be detected even if there actually is an overvoltage state.

Here it is supposed that, for example, when the rated voltage E is 3.3 V, the first reference voltage Vref1' is set to 3.6 V and the second reference voltage Vref2', is also set to 3.6 V. If the input end voltage Vo to the load 14 surpasses 3.6 V when the fallen voltage VD is 0 V, the outputs of both the first overvoltage detecting circuit 140' and the second overvoltage detecting circuit 150' will take on an H level, and the output of the logic circuit 160 will also take on an H level, making it possible to stop the PWM circuit 110 for protection from the overvoltage. Also, if the input end voltage Vo to the load 14 surpasses 3.6 V when the fallen voltage VD is 0.8 V, the outputs of both the first overvoltage detecting circuit 140' and the second overvoltage detecting circuit 150' will take on an H level, and the output of the logic circuit 160 will also take on an H level, making it possible to stop the PWM circuit 110 for protection from the overvoltage.

Thus, by using the diode DA 180, it is possible to prevent the output voltage of a troubled D.C. power supply circuit from flowing into other normally operating D.C. power supply circuits and causing the overvoltage detecting circuits of the normally operating D.C. power supply circuits. Even if the fallen voltage of the diode and the like varies, any overvoltage can be accurately detected by virtue of the combined arrangement of the first overvoltage detecting circuit and the second overvoltage detecting circuit.

Incidentally, even where the polarities of the anode and the cathode of the diode are inverse to those in FIG. 3 as in a negative voltage output power supply unit or the like, overvoltage detection can be accomplished in the same way as in the mode of implementation illustrated in FIG. 3 if the surpassing of the respective reference voltages by both the first overvoltage detecting circuit and the second overvoltage detecting circuit the negative side is chosen as the criterion of overvoltage detection.

As hitherto described, in this embodiment, only the power supply circuit having run into an overvoltage state out of the D.C. power supply circuits connected in parallel can be stopped without affecting other D.C. power supply circuits. Therefore, during redundant operation, even if one of the three D.C. power supply circuits stops, the remaining two circuits can feed power to the load. Accordingly, the electronic apparatus is prevented from stopping.

Next will be described the configuration and operation of a D.C. power supply circuit in a third embodiment of the invention with reference to FIG. 4.

Figure 4:
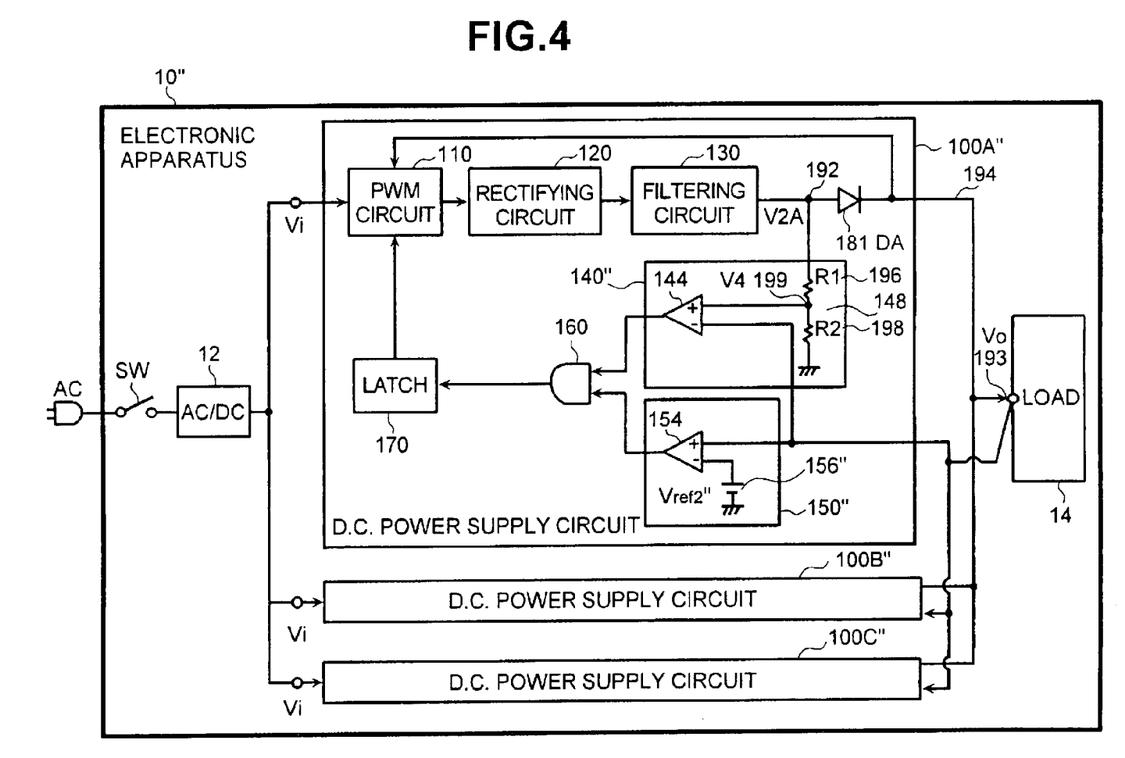
FIG. 4 shows a block diagram of an electronic apparatus using D.C. power supply circuits in a third embodiment of the present invention.

FIG. 4 is a block diagram of an electronic apparatus using a D.C. power supply circuit in the third embodiment of the invention. Incidentally, the same labels as in FIG. 1 and FIG. 3 denote respectively the same constituent elements.

An electronic apparatus 10" in this mode of implementation is provided with an A.C./D.C. converter 12, a load 14 and a plurality of D.C. power supply circuits 100A", 100B" and 100C" connected in parallel. The A.C./D.C. converter 12 and the load 14 are the same as the respectively corresponding ones shown in FIG. 1. The D.C. power supply circuits 100A", 100B" and 100C" have the same circuit configuration, the configuration being redundant by one circuit relative to the current capacity for supply to the load 14.

The configuration of the D.C. power supply circuits 100A", 100B" and 100C" will be described here, with the D.C. power supply circuit 100A" being taken up as an example.

The D.C. power supply circuit 100A" consists of a PWM (pulse width-modulating) circuit 110, a rectifying circuit 120, a filtering circuit 130, overvoltage detecting circuits 140" and 150", a logic circuit 160, a latching circuit 170 and a diode DA 181.

The configurations and operations of the PWM circuit 110, rectifying circuit 120 and filtering circuit 130 are the same as those of their respective counterparts shown in FIG. 1. To the output of the filtering circuit 130 is connected the diode DA 181. The anode side 192 of the diode DA 181 is connected to the output end of the filtering circuit 130, while its cathode side 194 is connected to the load 14.

The anode side 192 voltage V2A of the diode DA 181 is inputted to the first overvoltage detecting circuit 140", while the input end voltage Vo 193 of the load 14 is inputted to the second overvoltage detecting circuit 150".

The first overvoltage detecting circuit 140" consists of a voltage dividing circuit 148 further consisting of resistors R1 196 and R2 198 and a comparator 144. The voltage V2A 192 is resistance-divided by the voltage dividing circuit 148 to give V4 199. V4 199 is inputted to a positive input terminal of the comparator 144, while the input end voltage Vo 193 of the load 14 is inputted to a negative input terminal of the comparator 144. The comparator 144 compares the voltage resulting from the resistance division of the voltage V2A with the voltage Vo and, if the voltage resulting from the resistance division of the voltage Vo is higher than the voltage Vo, outputs an H level or, if it is lower, outputs an L level.

The second overvoltage detecting circuit 150" consists of a comparator 154 and a reference voltage 156". The voltage Vo is inputted to a positive input terminal of the comparator 15, while a second reference voltage Vref2 " 156" is inputted to a negative input terminal of the comparator 154. The comparator 154 compares the voltage Vo with the reference voltage Vref2 " and, if the voltage Vo is higher than the reference voltage Vref2", outputs an H level or, if it is lower, outputs an L level.

The logic circuit 160 outputs the logical product of the output of the first overvoltage detecting circuit 140" and the output of the second overvoltage detecting circuit 150". The logic circuit 160 outputs an H level when the outputs of both the first overvoltage detecting circuit 140" and the second overvoltage detecting circuit 150" have taken on an H level. Thus the logic circuit 160, when both the first overvoltage detecting circuit 140" and the second overvoltage detecting circuit 150" have detected an overvoltage, outputs a signal indicating the detection of an H level output, namely an overvoltage.

The output of the logic circuit 160, after being held by the latching circuit 170, is inputted to the PWM circuit 110. When the output of the latching circuit 170 is at an H level, the PWM circuit 110 stops its PWM operation to halt the operation of the D.C. power supply circuit 100A". An IC circuit constituting the PWM circuit 110 is provided with an enable terminal and, by inputting, for instance, the output of the latching circuit 170 to this enable terminal, the operation of the PWM circuit 110 can be either stopped or continued.

Optionally, by supplying the output of the logic circuit 160 outside the D.C. power supply circuit 100A", the occurrence of an overvoltage in the D.C. power supply circuit 100A" can be reported and noted outside of the D.C. power supply circuit 100A".

The operation of the circuit in this embodiment will be described below.

The diode DA 181 is provided to prevent, if any one D.C. power supply circuit out of the D.C. power supply circuits connected to the load 14 in parallel is stopped by the detection of an overvoltage by the first overvoltage detecting circuit 140", that overvoltage from flowing into other normally operating D.C. power supply circuits and stopping those D.C. power supply circuits operating normally. Thus, in the configuration illustrated in FIG. 4, if for instance the D.C. power supply circuit 100C" runs into an overvoltage state, the input end voltage Vo to the load 14 will rise, but as this voltage rise is blocked by the diode DA in the D.C. power supply circuit 100A", the first overvoltage detecting circuit 140" is prevented from operating erroneously.

Further, the second overvoltage detecting circuit 150" is provided to prevent uneven voltage falls of the diode DA 181 and the like, when the diode DA 181 has prevented any overvoltage from flowing into other power supply circuits, from causing the first overvoltage detecting circuit 140" to operate erroneously.

Here will be explained uneven voltage falls of the diode DA 181 and the like.

For instance, a fallen voltage of the diode DA 181 in the forward direction is denoted by VF. A voltage fall due to such factors as wiring between the cathode side of the diode DA and the input end of the load 14 is denoted by VC. Thus, a fallen voltage VD between the anode side of the diode DA and the input end of the load 14 will be (VF+VC). As both the fallen voltages VF and VC are varied by a current flowing through the diode and the wiring, the fallen voltage VF, for instance, varies between 0 V and 0.7 V, and the fallen voltage VC varies between 0 V and 0.1 V. Thus the fallen voltage VD varies between 0 V and 0.8 V. If, for instance, the rated voltage E of the input voltage Vo to the load 14 is 3.3 V, the fallen voltage VD will be between 0 V and 0.8 V, and accordingly the anode side voltage of the diode DA will be between 3.3 V and 4.1 V. The values of the resistances, R1 196 and R2 198 may be determined from comparator 144, where to get an H output V4 199 is greater than Vo:

$$Vo <= V2A*(R2/(R1+R2))$$

Since V2A=VD+Vo, where VD is the voltage drop across diode DA 181, Vo is:

$$Vo <= (VD+Vo)*(R2/(R1+R2))$$

$$Vo*(R1/(R1+R2)) <= VD*(R2/(R1+R2))$$

$$Vo/VD <= R2/R1$$

Thus if VD is 0.1 and Vo is 3.6 v, the ratio (R2/R1) is greater than or equal to 36. (R2/R1)=(100/2)=50 is one example of a ratio which satisfies this criteria.

Thus in this example, when the rated voltage E is 3.3 V, the second reference voltage Vref2 " is set to 3.6 V. The resistance ratio between the resistor R1 and the resistor R2 is set to, for example, 2 to 100. If the input end voltage Vo to the load 14 surpasses 3.6 V when the fallen voltage VD is 0.1 V, the outputs of both the first overvoltage detecting circuit 140" and the second overvoltage detecting circuit 150" will take on an H level, and the output of the logic circuit 160 will also take on an H level, making it possible to stop the PWM circuit 110 for protection from the overvoltage.

Thus, by using the diode DA, it is possible to prevent the output voltage of a troubled D.C. power supply circuit from flowing into other normally operating D.C. power supply circuits and causing the overvoltage detecting circuits of the normally operating D.C. power supply circuits to operate erroneously. Even if the fallen voltage of the diode and the like varies, any overvoltage can be accurately detected by virtue of the combined arrangement of the first overvoltage detecting circuit and the second overvoltage detecting circuit.

Incidentally, even where the polarities of the anode and the cathode of the diode are inverse to those in FIG. 3 as in a negative voltage output power supply unit or the like, overvoltage detection can be accomplished in the same way as in the mode of implementation illustrated in FIG. 4 if the surpassing of the respective reference voltages by both the first overvoltage detecting circuit and the second overvoltage detecting circuit the negative side is chosen as the criterion of overvoltage detection.

As hitherto described, in this embodiment, only the power supply circuit having run into an overvoltage state out of the D.C. power supply circuits connected in parallel can be stopped without affecting other D.C. power supply circuits. Therefore, during redundant operation, even if one of the three D.C. power supply circuits stops, the remaining two circuits can feed power to the load. Accordingly, the electronic apparatus is prevented from stopping.

According to embodiments of the present invention, it is possible to stop only a power supply circuit that has run into an overvoltage state out of D.C. power supply circuits connected in parallel and only minimally affecting other D.C. power supply circuits.

It is also possible to stop, in an electronic apparatus using D.C. power supply circuits connected in parallel, to stop only a power supply circuit that has run into an overvoltage state out of the D.C. power supply circuits connected in parallel without stopping other D.C. power supply circuits.

The preceding has been a description of the preferred embodiments of the invention. It will be appreciated that deviations and modifications can be made without departing from the scope of the invention, which is defined by the appended claims.

What is claimed is:

1. A method for supplying a load voltage to a load, comprising:
   supplying said load voltage from a D.C. power supply coupled to said load, wherein said P.C. power supply asserts a first value when an internal voltage is above a predetermined voltage, asserts a second value when said load voltage is above a reference voltage; and stops output of said load voltage, when said first value and said second value are asserted; and
   supplying said load voltage from another D.C. power supply coupled to said load, so that said load voltage continues to be supplied even if said D.C. power supply stops output of said load voltage.

2. A D.C. power supply system with overvoltage protection for supplying power to a load, comprising a plurality of D.C. power supply circuits connected in parallel, said plurality of D.C. power supply circuits comprising:
   a first D.C. power supply circuit of said plurality of D.C. power supply circuits comprising:
   a first overvoltage detection circuit for detecting if a voltage internal to said first D.C. power supply circuit exceeds a first predetermined voltage;
   a second overvoltage detection circuit for detecting if a first output of said first D.C. power supply circuit exceeds a first reference voltage, wherein said first output is connected to said load; and
   a first control circuit for shutting off said first D.C. power supply circuit, when said first overvoltage detecting circuit detects exceeding of said predetermined voltage and said second overvoltage detecting circuit detects exceeding of said reference voltage; and
   a second D.C. power supply circuit of said plurality of D.C. power supply circuits for continuing to supply power to said load, when said first D.C. power supply circuit is shut off due to overvoltage.

3. A D.C. power supply circuit for obtaining a D.C. output by filtering signals that are pulse width-modulated and rectified, said filtering using a filter, said D.C. power supply comprising:
   a first overvoltage detecting circuit for detecting any surpassing of a first reference voltage by filtering an input of said filter;
   a second overvoltage detecting circuit for detecting any surpassing of a second reference voltage by filtering an output of said filter; and
   a logic circuit for asserting an overvoltage output when said first overvoltage detecting circuit detects surpassing of said first reference voltage and second overvoltage detecting circuit detects surpassing of said second reference voltage, wherein:
   said D.C. output is stopped, when said overvoltage output is asserted.

4. The D.C. power supply of claim 3 wherein said filter is a low pass filter.

5. A D.C. power supply circuit for obtaining a D.C. output by filtering signals that are pulse width-modulated and rectified, said filtering using a filtering circuit, said D.C. power supply comprising:
   a diode coupled at an anode side to said filtering circuit and at a cathode side to a load; filtering
   a first overvoltage detecting circuit for detecting any surpassing of a first reference voltage by said anode side voltage of said diode;
   a second overvoltage detecting circuit for detecting any surpassing of a second reference voltage by said cathode side voltage of said diode; and
   a logic circuit for asserting an overvoltage output when said first overvoltage detecting circuit detects surpassing of said first reference voltage and second overvoltage detecting circuit detects surpassing of said second reference voltage, wherein:
   said D.C. output is stopped, when said overvoltage output is asserted.

6. A D.C. power supply circuit for obtaining a D.C. output by filtering signals that are pulse width-modulated and rectified, said filtering using a filtering circuit, said D.C. power supply comprising:
   a diode coupled at an anode side to said filtering circuit and at a cathode side to a load;
   a first overvoltage detecting circuit for detecting any surpassing of a load voltage by an attenuated anode side voltage of said diode;
   a second overvoltage detecting circuit for detecting any surpassing of a reference voltage by said cathode side voltage of said diode; and
   a logic circuit for asserting an overvoltage output when said first overvoltage detecting circuit detects surpassing of said load voltage and second overvoltage detecting circuit detects surpassing of said reference voltage, wherein:
   said D.C. output is stopped, when said overvoltage output is asserted.

7. The D.C. power supply of claim 6 wherein said attenuated anode side voltage is from a voltage divider circuit having said anode side voltage as an input.

8. An overvoltage circuit in a D.C. power supply, for inhibiting a D.C. output of said D.C. power supply from rising above a prescribed voltage, wherein said D.C. power supply comprises a voltage supplying source coupled to a filter, said overvoltage circuit comprising:
   a first overvoltage detecting circuit coupled to an input of said filter;
   a second overvoltage detecting circuit coupled to an output of said filter; and
   a logic gate coupled to said first overvoltage detecting circuit and said second overvoltage detecting circuit, said logic gate having a gate output for controlling said voltage supplying source.

9. The overvoltage circuit of claim 8, wherein said voltage supplying source is turned off, when said gate output is asserted due to a first detection of said first overvoltage detecting circuit and a second detection of said second overvoltage detecting circuit.

10. The overvoltage circuit of claim 9, wherein said first detection occurs, when said first overvoltage detecting circuit detects a first voltage above a first reference voltage and wherein said second detection occurs, when said second overvoltage detecting circuit detects a second voltage above a second reference voltage.

11. The overvoltage circuit of claim 8, wherein said voltage supplying source comprises a pulse width modulated circuit coupled with a rectifying circuit.

12. The overvoltage circuit of claim 8, wherein said first overvoltage detecting circuit comprises a low pass filter coupled with a first comparator.

13. The overvoltage circuit of claim 12, wherein said low pass filter is coupled to said input of said filter and said first comparator is coupled to said logic gate.

14. The overvoltage circuit of claim 12, wherein said low pass filter comprises a resistor (R) coupled to a capacitor (C).

15. The overvoltage circuit of claim 8, wherein said second overvoltage detecting circuit comprises a second comparator.

16. An overvoltage system for N+1 D.C. power supplies supplying
   a load voltage to a load, said N+1 D.C. power supplies coupled together in parallel, wherein N is an integer, said overvoltage system comprising:
   a first power supply of said N+1 D.C. power supplies, comprising:
   a plurality of overvoltage detecting circuits in said first power supply, wherein one overvoltage detecting circuit of said plurality of overvoltage detecting circuits compares said load voltage with a reference voltage; and a logic gate receiving outputs of said plurality of overvoltage detecting circuits for turning off said first power supply when an overvoltage occurs in said first power supply; and N other power supplies of said N+1 D.C. power supplies, wherein when said first power supply is turned off, said N other power supplies continue to supply power to said load to maintain said load voltage.

17. A method for stopping operation of a D.C. power supply circuit with an overvoltage, wherein said D.C. power supply circuit is coupled to a load, said method comprising:

determining a first comparison value by comparing an output voltage of said a D.C. power supply circuit to said load with a reference voltage;

determining a second comparison value using at least one voltage internal to said D.C. power supply circuit;

evaluating a logic value of said first comparison value logically combined with said second comparison value; and when said logic value indicates said overvoltage, stopping D.C. output of said D.C. power supply to said load.

18. The method of claim 17, wherein when said D.C. power supply circuit is one of a plurality of D.C. power supply circuits supplying D.C. power to said load, and when said D.C. power supply circuit stops supplying power due to an overvoltage, other D.C. power supply circuits of said plurality of D.C. power supply circuits supply D.C. power needed by said load.

19. The method of claim 18 wherein logically combined is a logical and operation.

20. The method of claim 17, wherein said D.C. power supply circuit D.C. power supply circuit comprises a pulse width modulation circuit coupled to a rectifying circuit, said rectifying circuit coupled to a filter circuit.

21. The method of claim 17, wherein said one voltage internal to said D.C. power supply circuit includes an input to said filtering circuit.

22. The method of claim 17, wherein said one voltage internal to said D.C. power supply circuit includes an output of said filtering circuit.

23. The method of claim 17 wherein said determining a second comparison value compares said at least one voltage internal to said D.C. power supply circuit to either said load voltage or another reference voltage.

24. An electronic apparatus, comprising a plurality of D.C. power supply circuits, each D.C. power supply circuit of said plurality of D.C. power supply circuits for obtaining a D.C. output by filtering a rectified, pulse width-modulated signal, wherein a D.C. power supply circuit of said plurality of D.C. power supply circuits comprises:

a first overvoltage detecting circuit for detecting any surpassing of a first reference voltage by an input of said filtering circuit;

a second overvoltage detecting circuit for detecting any surpassing of a second reference voltage by an output of said filtering circuit; and a logic circuit for producing an overvoltage state output when said first overvoltage detecting circuit has surpassed said first reference voltage and said second overvoltage detecting circuit has surpassed said second reference voltage, wherein:

said D.C. power supply circuit D.C. output is stopped by said overvoltage state output.

25. An electronic apparatus, comprising a plurality of D.C. power supply circuits, each D.C. power supply circuit of said plurality of D.C. power supply circuits for obtaining a D.C. output by filtering, a rectified, pulse width-modulated signal, wherein a D.C. power supply circuit of said plurality of D.C. power supply circuits comprises:

a diode, including an input coupled to a filtering circuit of said D.C. power supply circuit and an output coupled to a load;

a first overvoltage detecting circuit for detecting any surpassing of a first reference voltage by an input voltage of said diode;

a second overvoltage detecting circuit for detecting any surpassing of a second reference voltage by an output voltage of said diode; and a logic circuit for producing an overvoltage state output when said first overvoltage detecting circuit has surpassed said first reference voltage and said second overvoltage detecting circuit has surpassed said second reference voltage, wherein:

said D.C. power supply circuit D.C. output is stopped by said overvoltage state output.

26. An overvoltage system for N+m D.C. power supplies supplying a load voltage to a load, said N+m D.C. power supplies coupled together in parallel, wherein N and m are integers, said overvoltage system comprising:

a first power supply of said N+m D.C. power supplies, comprising:

a plurality of overvoltage detecting circuits in said first power supply, wherein one overvoltage detecting circuit of said plurality of overvoltage detecting circuits compares said load voltage with a reference voltage; and a logic gate receiving outputs of said plurality of overvoltage detecting circuits for turning off said first power supply when an overvoltage occurs in said first power supply; and N+m−1 other power supplies of said N+m D.C. power supplies, wherein when said first power supply is turned off, said N+m−1 other power supplies continue to supply power to said load to maintain said load voltage.

27. An electronic apparatus, comprising a plurality of overvoltage circuits in a D.C. power supply, each overvoltage circuit of said plurality of overvoltage circuits for inhibiting a D.C. output of said D.C. power supply from rising above a prescribed voltage, wherein said D.C. power supply comprises a voltage supplying source coupled to a filter, said overvoltage circuit comprises:

a first overvoltage detecting circuit coupled to an input of said filter;

a second overvoltage detecting circuit coupled to an output of said filter; and a logic gate coupled to said first overvoltage detecting circuit and said second overvoltage detecting circuit, said logic gate having a gate output for controlling said voltage supplying source.

28. An electronic apparatus comprising a plurality of circuits configured to execute the method of claim 1.

* * * * *